US012598385B2

(12) United States Patent
Stern et al.

(10) Patent No.: US 12,598,385 B2
(45) Date of Patent: \*Apr. 7, 2026

(54) WIDE ANGLE ADAPTER LENS FOR ENHANCED VIDEO STABILIZATION

(71) Applicant: GoPro, Inc., San Mateo, CA (US)

(72) Inventors: Jonathan Stern, San Mateo, CA (US); Peiqian Zhao, Mountain View, CA (US); Ingrid A. Cotoros, Hillsborough, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/888,266

(22) Filed: Sep. 18, 2024

(65) Prior Publication Data

US 2025/0016446 A1     Jan. 9, 2025

Related U.S. Application Data

(63) Continuation of application No. 18/008,763, filed as application No. PCT/US2020/042749 on Jul. 20, 2020, now Pat. No. 12,101,556.

(51) Int. Cl.
*H04N 5/335* (2011.01)
*G02B 27/64* (2006.01)
(Continued)

(52) U.S. Cl.
CPC ......... *H04N 23/683* (2023.01); *G02B 27/646* (2013.01); *G03B 17/565* (2013.01); *H04N 23/55* (2023.01)

(58) Field of Classification Search
CPC .................................................. H04N 23/683
See application file for complete search history.

(56) References Cited

U.S. PATENT DOCUMENTS

| | | | |
|---|---|---|---|
| 5,828,406 A | 10/1998 | Parulski | |
| 8,294,988 B2 | 10/2012 | Cook | |

(Continued)

FOREIGN PATENT DOCUMENTS

| | | | |
|---|---|---|---|
| CN | 118338124 A | * | 7/2024 |
| EP | 1619882 A2 | | 1/2006 |
| JP | 2001285694 A | * | 10/2001 |

OTHER PUBLICATIONS

International Preliminary Report on Patentability issued in App. No. PCT/US2020/042749, mailing date Feb. 2, 2023, 7 pages.

(Continued)

*Primary Examiner* — Gary C Vieaux
(74) *Attorney, Agent, or Firm* — Young Basile Hanlon & MacFarlane, P.C.

(57) ABSTRACT

An image capture system for enhanced electronic image stabilization (EIS) includes an image capture device and an adapter lens. The image capture device includes an image sensor, a lens housing, a processor, and a lens assembly that includes a first group of optical elements disposed within the lens housing. The first group of optical elements are used project an image onto the image sensor. The processor performs EIS. The adapter lens is used to enhance EIS of the image capture device. The adapter lens has an adapter lens housing that interfaces with the lens housing. The lens housing automatically detects the adapter lens.

20 Claims, 10 Drawing Sheets

(51) Int. Cl.
    *G03B 17/56*         (2021.01)
    *H04N 23/55*       (2023.01)
    *H04N 23/68*       (2023.01)

(56)            References Cited

U.S. PATENT DOCUMENTS

| | | | |
|---|---|---|---|
| 8,961,405 B2 * | 2/2015 | Murata | A61B 1/0676 |
| | | | 600/179 |
| 9,743,001 B1 | 8/2017 | Stec | |
| 11,477,381 B1 * | 10/2022 | Karpushin | G06T 7/215 |
| 2010/0149408 A1 | 6/2010 | Ito | |
| 2013/0028590 A1 | 1/2013 | Hasuda | |
| 2017/0102513 A1 | 4/2017 | Ogata | |
| 2023/0224584 A1 | 7/2023 | Stern | |

OTHER PUBLICATIONS

International Search Report and Written Opinion for App. No. PCT/US2020/042749, mailing date Apr. 15, 2021, 10 pages.

* cited by examiner

800

DETECT AN
ADAPTER LENS — 810

ADJUST
ELECTRONIC
IMAGE
STABILIZATION — 820
(EIS) ALGORITHM

CAPTURE VIDEO — 830

APPLY ADJUSTED
EIS ALGORITHM — 840

OUTPUT
STABILIZED — 850
VIDEO

WIDE ANGLE ADAPTER LENS FOR ENHANCED VIDEO STABILIZATION

CROSS-REFERENCE TO RELATED APPLICATIONS

This application is a continuation of U.S. patent application Ser. No. 18/008,763, filed Dec. 7, 2022, which is a 371 of International Application No. PCT/US2020/042749 filed on Jul. 20, 2020, the entire disclosures of which are hereby incorporated by reference.

TECHNICAL FIELD

This disclosure relates to image capture devices. In particular, this disclosure relates to video stabilization of image capture devices.

BACKGROUND

Image capture devices may be configured to perform electronic image stabilization (EIS) without the use of mechanical stabilization systems, such as, for example, a gimbal. During some extreme activities such as mountain biking, skiing, or the like, it may be desirable to enhance video stabilization beyond the EIS capability of the image capture device. Systems and methods are needed to improve the EIS capability of image capture devices.

SUMMARY

Disclosed herein are implementations of an image capture system for using an adapter lens for enhanced electronic image stabilization (EIS). In an aspect, the image capture system may include an image capture device and an adapter lens. The image capture device may include an image sensor, a lens housing, a lens assembly, and a processor. The lens assembly may include a first group of optical elements. The first group of optical elements may be disposed within the lens housing. The first group of optical elements may be configured to project an image onto the image sensor. The processor may be configured to perform EIS. The adapter lens may be configured to enhance EIS of the image capture device. The adapter lens may be a detachable adapter lens. The adapter lens may include an adapter lens housing that is configured to interface with the lens housing. The adapter lens may include a second group of optical elements disposed within the adapter lens housing. The second group of optical elements may be configured to project the image onto the image sensor as an image circle.

In an aspect, an image capture device may include an image sensor, a lens housing, a lens, and a processor. The lens housing may be configured to couple to a detachable adapter lens configured to enhance EIS. The lens may include a group of optical elements disposed within the lens housing. The group of optical elements may be configured to project the image onto the image sensor. The processor may be configured to perform EIS.

In an aspect, a method for enhanced EIS may include detecting an adapter lens. The method may include adjusting an EIS algorithm based on the adapter lens. The method may include capturing video comprising frames. The method may include applying the adjusted EIS algorithm to the frames to obtain stabilized frames. The method may include outputting the stabilized frames as stabilized video.

In an aspect, an image capture system includes an image capture device and an adapter lens. The image capture device includes an image sensor, a lens housing, a lens assembly, and a processor. The lens assembly includes a first group of optical elements disposed within the lens housing. The processor may be configured to perform EIS. The adapter lens may be configured to enhance EIS of the image capture device. The adapter lens may include an adapter lens housing and a second group of optical elements disposed within the adapter lens housing. The adapter lens housing may be configured to interface with the lens housing. The lens housing may be configured to automatically detect the adapter lens. The second group of optical elements may be configured to project an image as an image circle on the image sensor. The processor may be configured to adjust an EIS algorithm based on the detected adapter lens.

In an aspect, an image capture device may include an image sensor, a lens housing, a lens, and a processor. The lens housing may be configured to couple to and automatically detect a detachable adapter lens configured to enhance EIS. The lens may include a first group of optical elements disposed within the lens housing. The processor may be configured to perform EIS and adjust an EIS algorithm based on the detected adapter lens.

In an aspect, a method may include detecting an adapter lens. The method may include adjusting an EIS algorithm based on the adapter lens. The method may include applying the adjusted EIS algorithm to video frames to obtain stabilized frames. The method may include outputting the stabilized frames as stabilized video.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
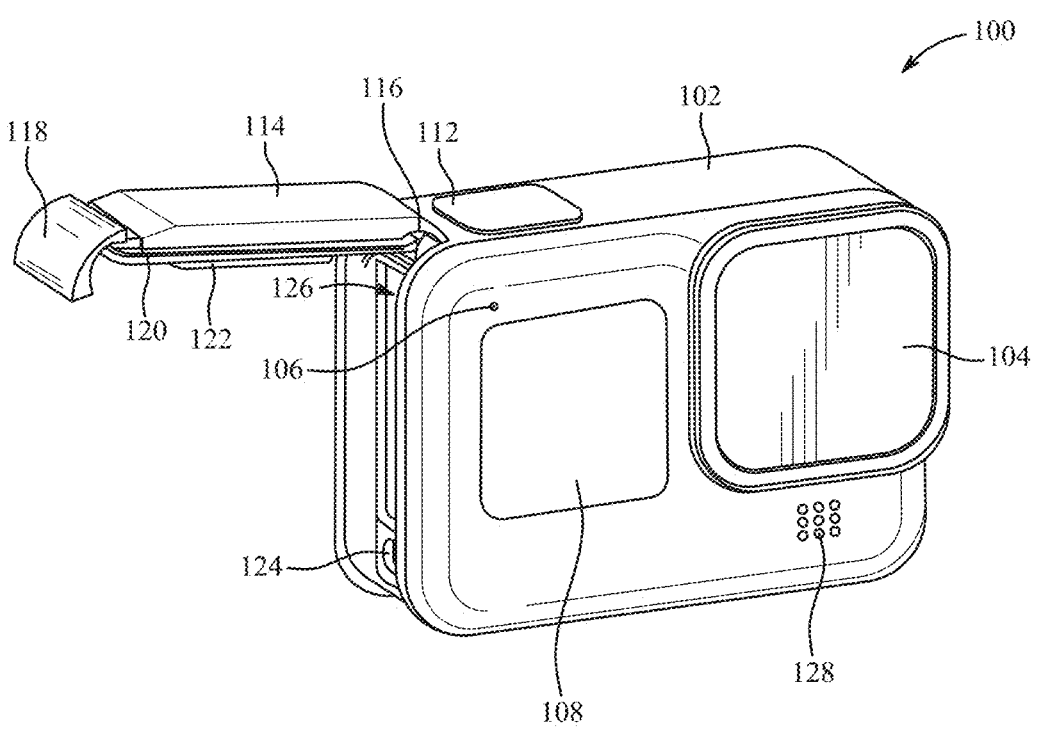
FIGS. 1A-1B are isometric views of an example of an image capture device.

Image capture devices may be configured to perform electronic image stabilization (EIS) without the use of mechanical stabilization systems, such as, for example, a gimbal. During some extreme activities such as mountain biking, skiing, or the like, it may be desirable to enhance video stabilization beyond the EIS capability of the image capture device. In the embodiments described herein, an adapter lens may be used to perform enhanced video stabilization. The adapter lens may be detachable.

As described herein, an adapter lens may be placed between the native lens of the image capture device and the scene to be captured to increase the stabilization margin of the image capture device. The adapter lens may be attached to the native lens to increase the field of view of the image capture device. For example, the adapter lens may be a wide angle lens so that when EIS is used, the crop window may be moved across an increased range of angles to compensate for larger image capture device displacements. Compensating for larger image capture device displacements may allow for stable video capture to be maintained across more use cases, such as extreme mountain biking, skiing, or the like.

The adapter lens, when attached to the lens of the image capture device, may create a full fisheye view such that a projected image circle is inscribed within the image sensor height. In the embodiments disclosed herein, a calibration process is not required when attaching the adapter lens. In some examples, the crop window may be rotated around the optical axis to provide enhanced image capture device roll stabilization. In some embodiments, the EIS algorithm of the image capture device may be adjusted to accommodate the optical distortion of the native image capture device lens and the adapter lens in combination to correctly map between the optical field of view and the crop window. The distortion is well controlled between the adapter lens and multiple mounting cycles so that a pre-stored distortion calibration remains valid. In some examples, the adapter lens and the native image capture device lens may be rigidly coupled to minimize relative motion that could cause dynamic changes to the optical distortion.

In the embodiments described herein, an image capture device may obtain digital video comprising a sequence of frames depicting a scene. The sequence of frames may include a reference frame and a second frame, which each depict a common plurality of depicted points in the scene. A reference point may be determined from the common plurality of points. The reference point corresponds to a point in the image that will be stabilized by the stabilization process, for example, by reducing depicted motion of this point between image frames. In one or more embodiments, the reference point may comprise a point depicted at a predetermined pixel location (e.g., a center pixel) of a predetermined reference frame (e.g., a first frame). Alternatively, the reference point may be dynamically selected based on various characteristics of the video. For example, content recognition may be applied to the video and the reference point may be chosen as a point on a particular object (e.g., a center of a face, a point along a horizon or edge, etc.). The reference point corresponds to different pixel locations in the reference image and the second image (e.g., due to camera motion between capturing the images). A warping function may be applied to the second frame of the digital video to generate a warped second frame. The warping function warps the second frame such that depicted points of the depicted scene in the warped second frame are shifted non-uniformly relative to corresponding depicted points in the second image. Furthermore, applying the warping function decreases depicted movement of the reference point between the reference frame and the second frame, resulting in a stabilized image. This process may be repeated for stabilizing additional frames with respect to the reference frame. Furthermore, in some instances a new reference point may be determined, either periodically or when certain conditions are met. Once the stabilized frames are produced, a stabilized video may be generated by combining the stabilized frames and reference frames into the appropriate sequence.

Figure 1B:
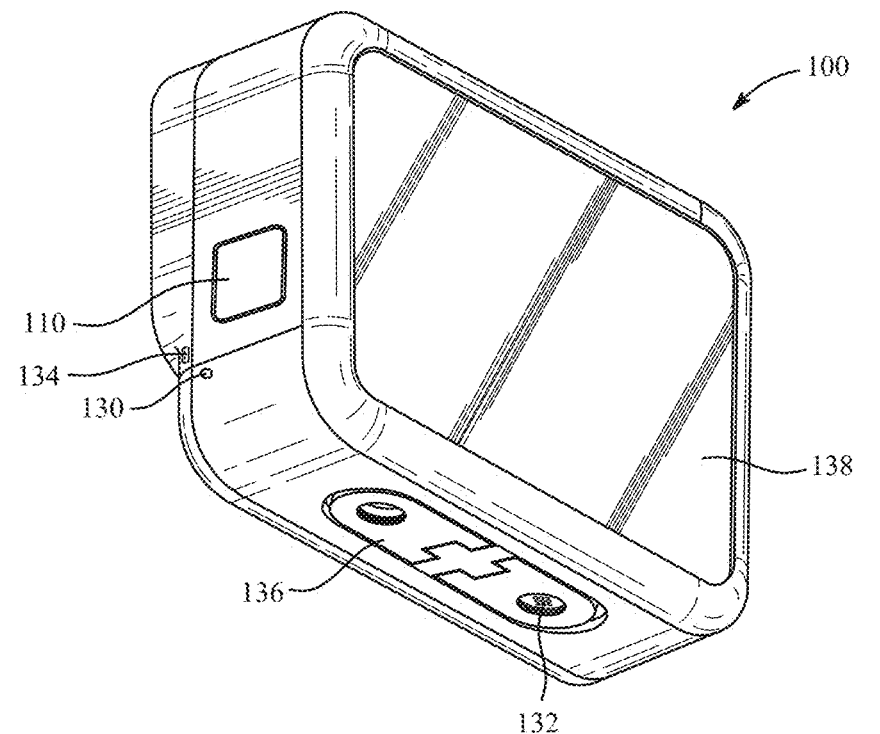

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 7:
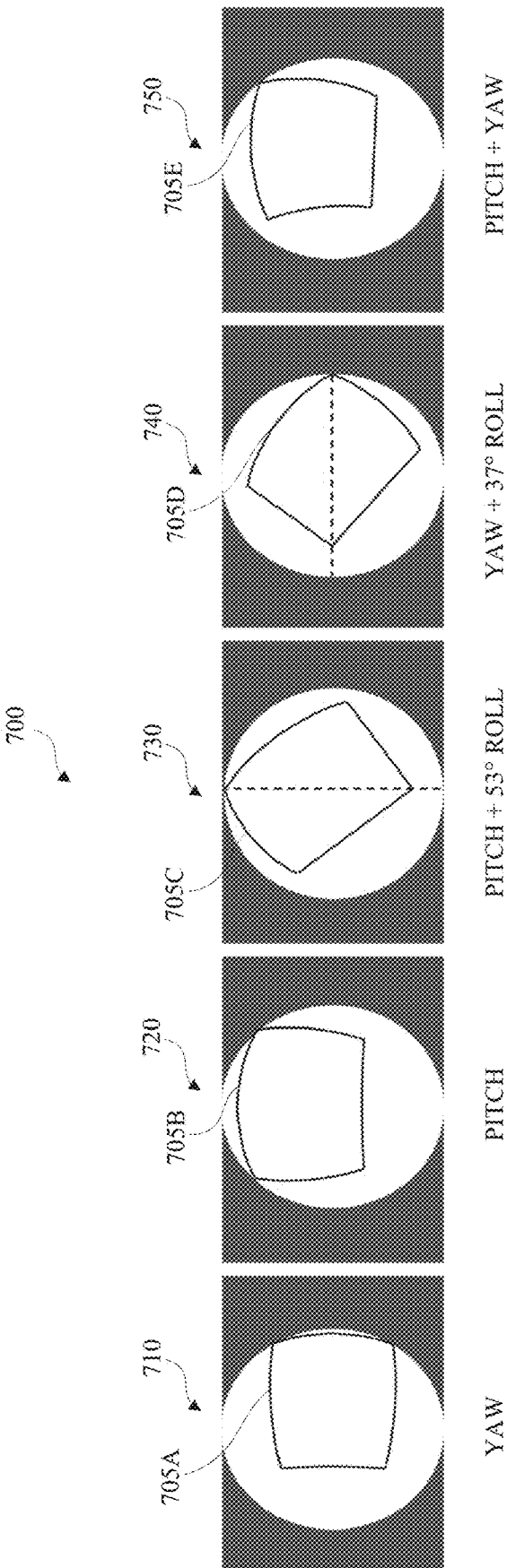
FIG. 7 is a diagram of examples of enhanced electronic image stabilization (EIS) margins of an adapter lens.

The image capture device 100 may be used to implement some or all of the techniques described in this disclosure, such as the technique 700 described in FIG. 7.

Figure 2A:
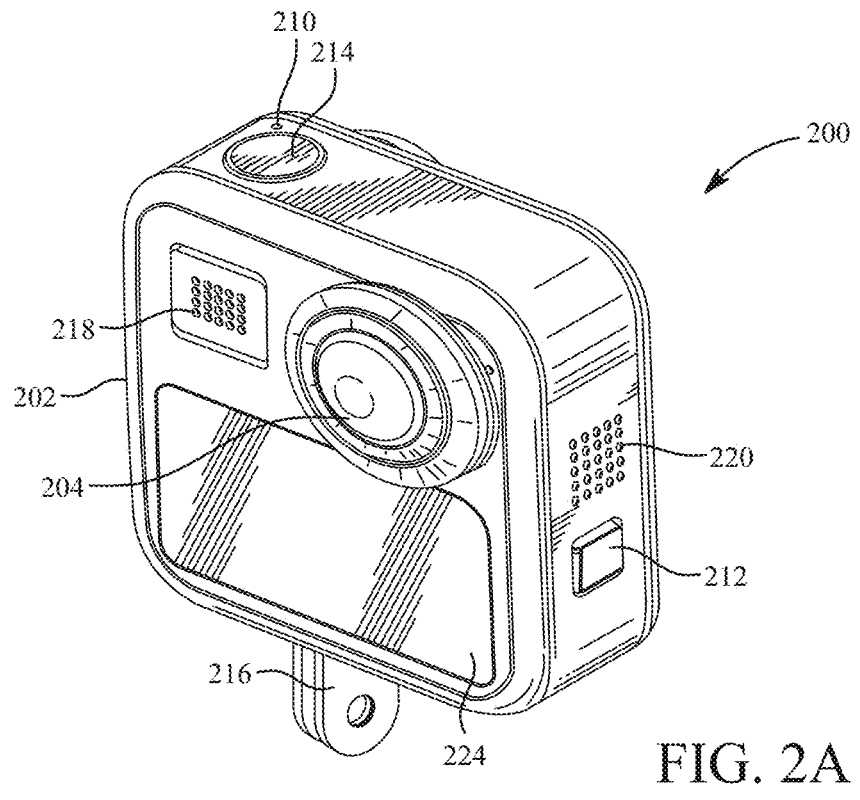
FIGS. 2A-2B are isometric views of another example of an image capture device.
Figure 2B:
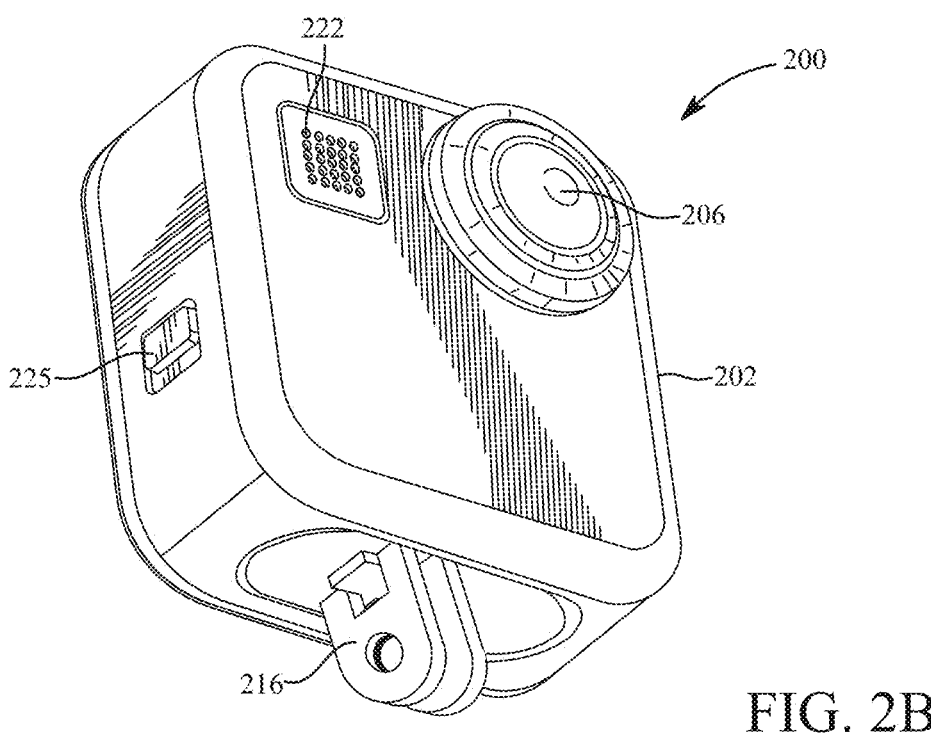

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 2C:
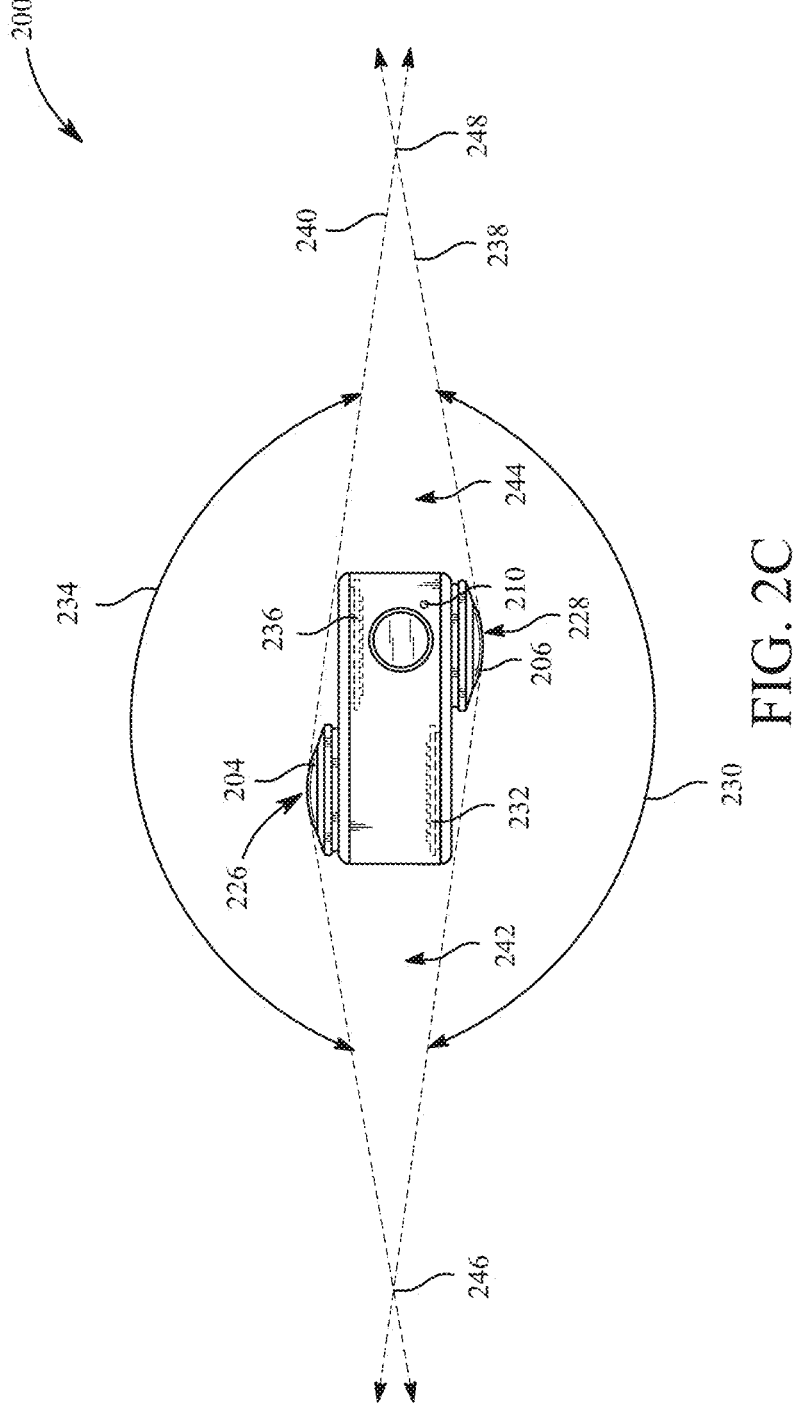
FIG. 2C is a top view of the image capture device of FIGS. 2A-B.
Figure 2D:
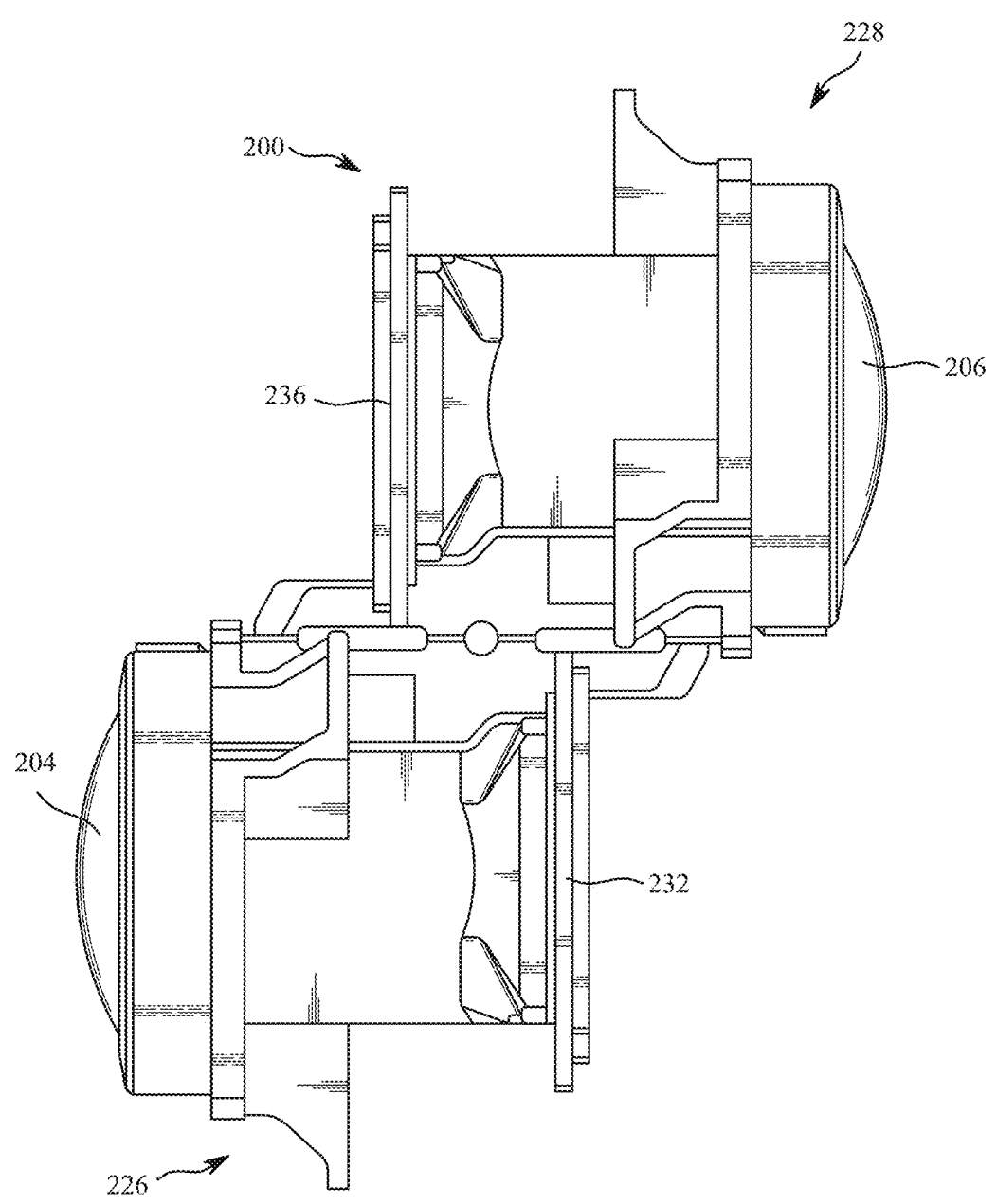
FIG. 2D is a partial cross-sectional view of the image capture device of FIG. 2C.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device 226 and a second image capture device 228. The first image capture device 226 defines a first field-of-view 230 and includes the lens 204 that receives and directs light onto a first image sensor 232. Similarly, the second image capture device 228 defines a second field-of-view 234 and includes the lens 206 that receives and directs light onto a second image sensor 236. To facilitate the capture of spherical images, the image capture devices 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone." In the dead zone, light may be obscured from the lenses 204, 206 and the corresponding image sensors 232, 236, and content in the blind spots 242, 244 may be omitted from capture. In some implementations, the image capture devices 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

The image capture device 200 may be used to implement some or all of the techniques described in this disclosure, such as the technique 700 described in FIG. 7.

Figure 3:
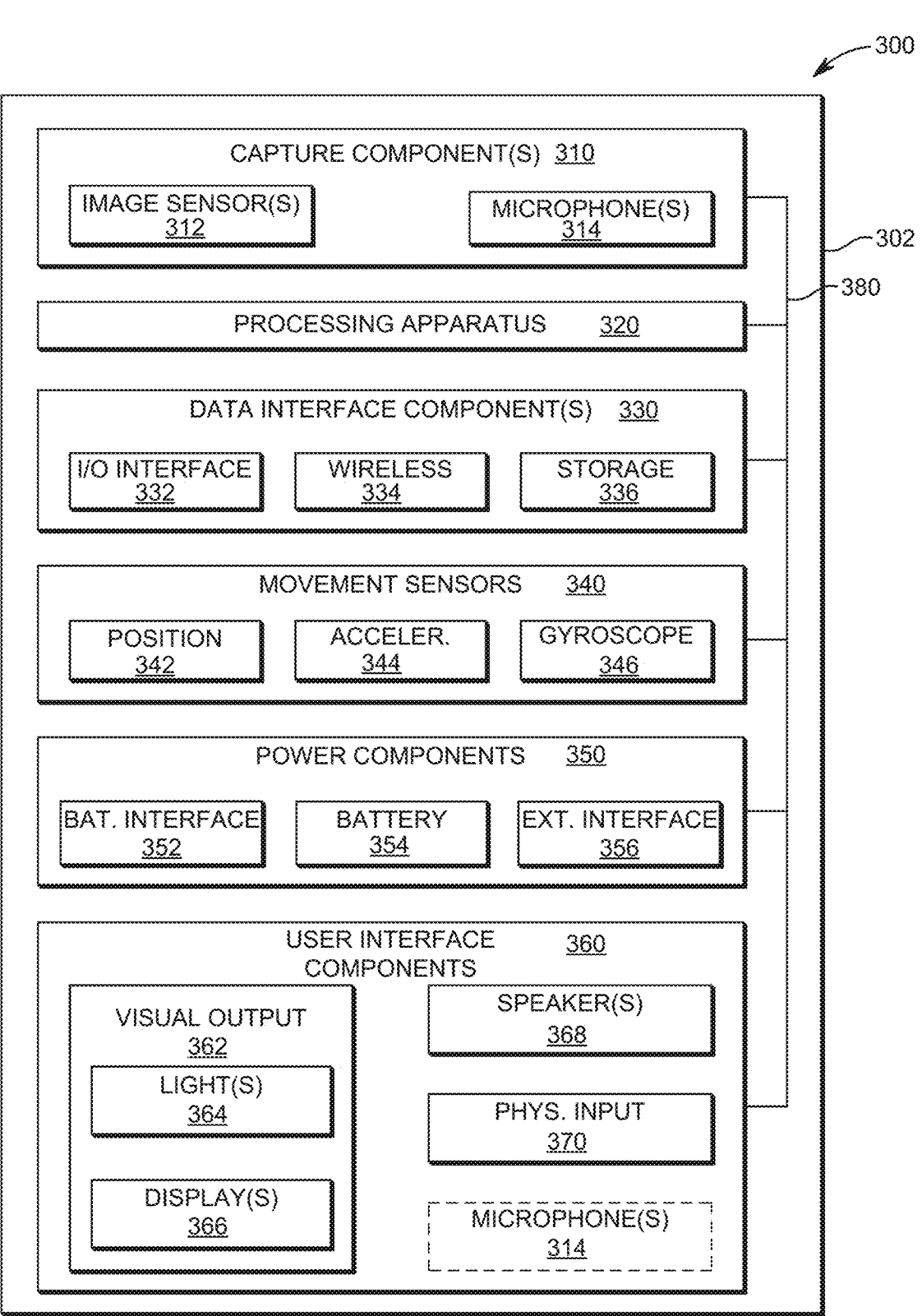
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. For example, the processing apparatus 320 may be configured to perform EIS by defining a crop window, and mapping the pixels based on inertial measurement unit IMU data from one or more movement sensors. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may be used to implement some or all of the techniques described in this disclosure, such as the technique 700 described in FIG. 7.

Figure 4:
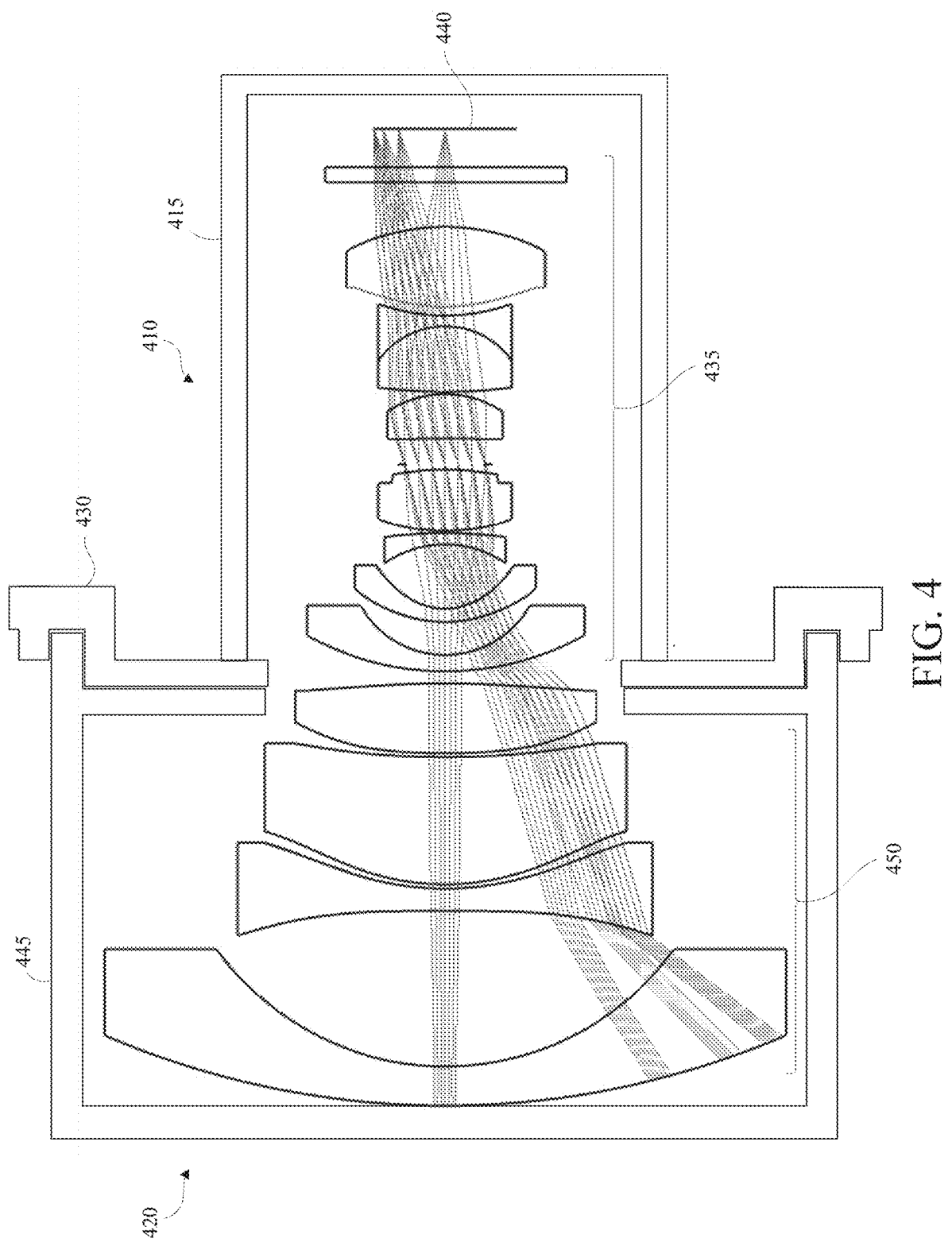
FIG. 4 is a partial cross-sectional view of an image capture device lens assembly and an adapter lens.

FIG. 4 is a partial cross-sectional view of an image capture device lens assembly 410 and an adapter lens 420. In some embodiments, the adapter lens 420 may have a greater field of view (FOV) than the image capture device lens assembly 410. As shown in FIG. 4, the image capture device lens assembly 410 includes a lens housing 415. The lens housing 415 may be coupled to in an internal portion of an image capture device body 430, such as body 102 shown in FIG. 1A, body 202 shown in FIG. 2A, or body 302 shown in FIG. 3. The lens housing 415 may include one or more optical elements 435 and an image sensor 440. In some embodiments, the lens housing 415 may include an image capture device cover glass (not shown). The image capture device cover glass may protect the one or more optical elements 435 from dust, debris, water, etc., and allow light to pass from outside the image capture device through the one or more optical elements 435 and to the image sensor 440.

The one or more optical elements 435 may include spherical elements, aspherical elements, or any combination thereof. The one or more optical elements 435 are configured to project an image onto the image sensor 440. The image sensor 440 may have a rectangular surface area. The rectangular surface area may have a 4:3 aspect ratio, a 16:9 aspect ratio, or any other aspect ratio.

The adapter lens 420 includes an adapter lens housing 445. The adapter lens housing 445 may be coupled to the lens housing 415, an outer portion of the image capture device body 430, or both. The adapter lens 420 may be rigidly coupled to the lens housing 415, the image capture device body 430, or both, to minimize relative motion that could cause dynamic changes to the optical distortion. The adapter lens housing 445 includes one or more optical elements 450. The one or more optical elements 450 may include spherical elements, aspherical elements, or any combination thereof. In some embodiments, the image capture device cover glass (not shown) may separate the optical elements of the adapter lens and the optical elements 435 of the image capture device. The one or more optical elements 450 may be configured to obtain a scene, convert the scene to an image circle, and project the image circle onto the image sensor 440 via the optical elements 435. The image circle may have any resolution, for example, the image circle may have a resolution of 4223×4223 pixels. The adapter lens 420 may be used to increase the FOV of the image capture device lens assembly 410. For example, the adapter lens 420, when attached to the lens assembly 410 of the image capture device, may create a full fisheye view such that a projected image circle onto the image sensor 440 is inscribed within the image sensor height.

The image sensor may be electrically coupled to a processor, such as processing apparatus 320 shown in FIG. 3. A mapping table may be stored in a memory of the processor. The mapping table may include distortion values based on a combination of the optical distortion of the image capture device lens assembly 410 and the optical distortion of the adapter lens 420. The processor may be configured to perform EIS by adjusting the EIS algorithm based on the mapping table to compensate for the adapter lens 420.

Figure 5:
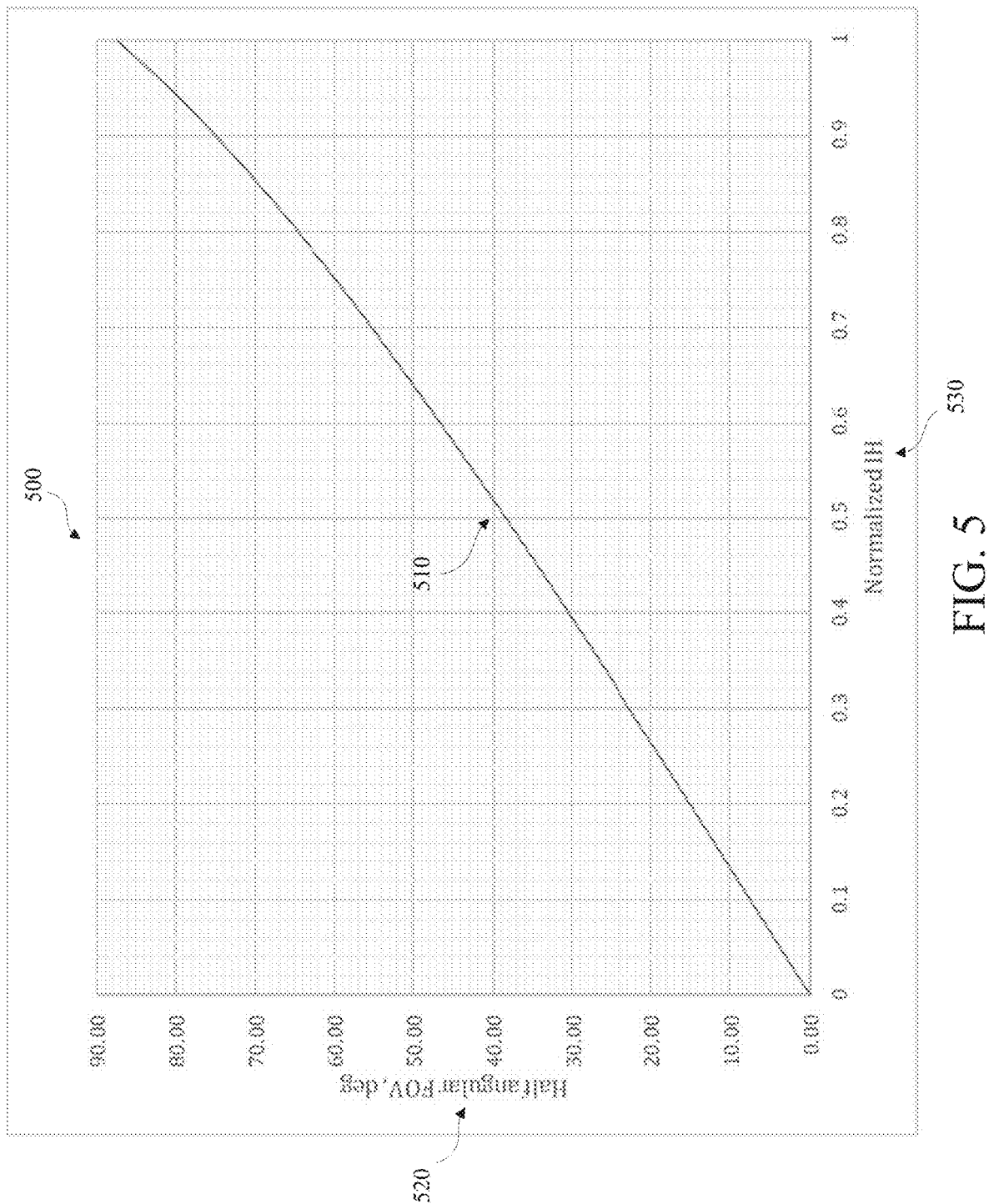
FIG. 5 is a diagram of an example of a graph of a mapping table.

FIG. 5 is a diagram of an example of a graph of a mapping table 500. As shown in FIG. 5, the mapping table 500 shows that distortion 510 is the relationship between the half angular FOV 520 and the normalized image sensor height (IH) 530. The half angular FOV 520 may also be referred to as the field angle. The distortion of the combination of the image capture device lens and the adapter lens is designed to meet the relationship shown in the mapping table 500. The relationship may be axially symmetric. To create the mapping table 500, the image capture device lens and the adapter lens may be considered as one system. The final distortion may be obtained by changing the parameters of the adapter lens while the image capture device lens parameters are fixed. In other words, the adapter lens parameters are changed not only to compensate for the distortion of the image capture device lens, but also to ensure that the distortion specification of the combination of the adapter lens and the image capture device lens are met as well. The mapping table 500 may be used to adjust the EIS algorithm to compensate for the adapter lens when using the adapter lens to perform enhanced EIS.

Figures 6A, 6B, 6C:
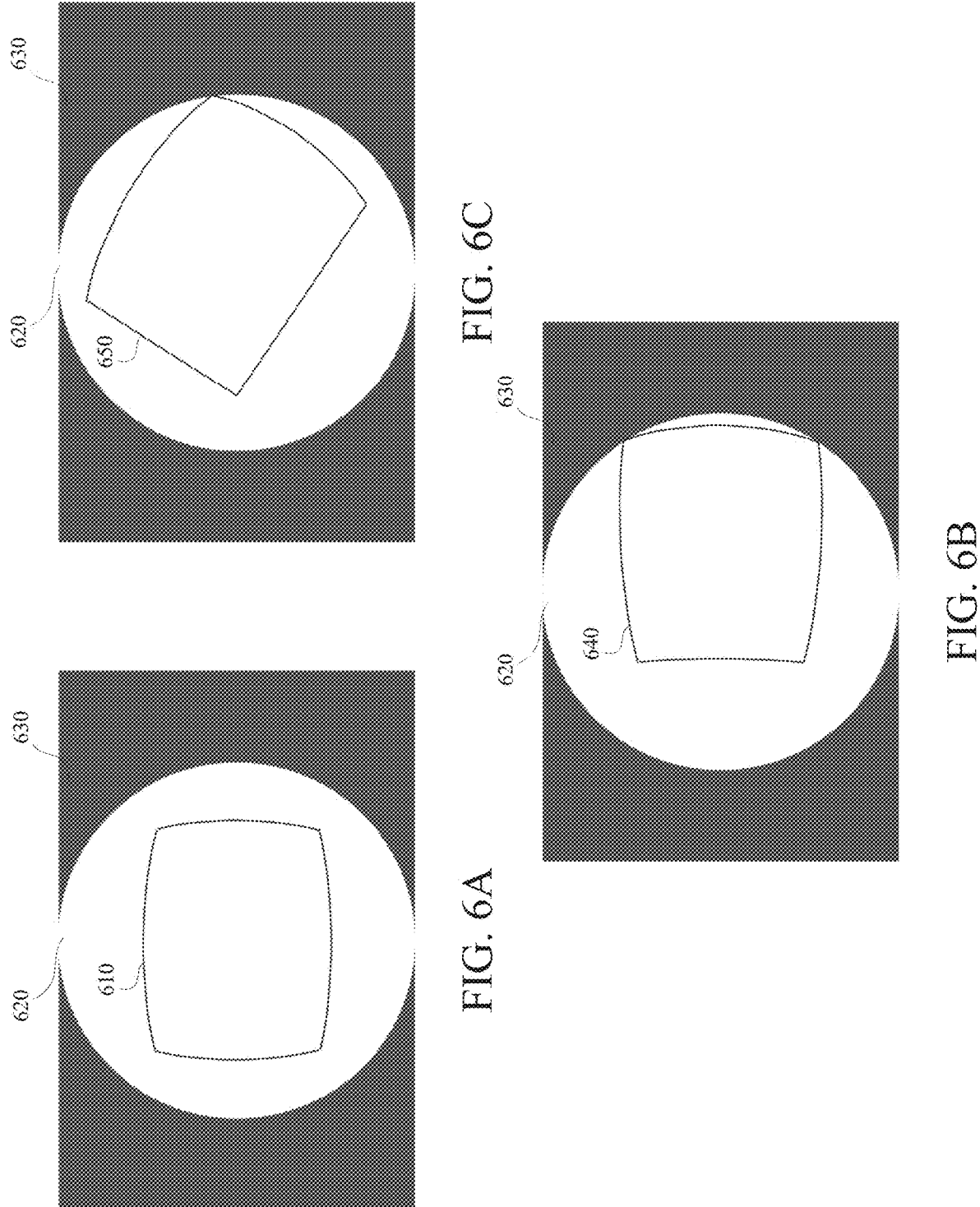
FIG. 6A is a diagram showing an example of a crop area in the center of the image circle.
FIG. 6B is a diagram showing an example of a crop area at an edge of the image circle.
FIG. 6C is a diagram showing an example of a crop area at another edge of the image circle.

FIG. 6A is a diagram showing an example of a crop area 610 in the center of the image circle 620. In this example, a target resolution for the crop area 610 may be 2.7K, i.e., 2704×2028 pixels. As shown in this example, the image circle 620 is inscribed within the height of the image sensor 630. The image circle is obtained using an adapter lens, such as adapter lens 420 shown in FIG. 4. Table 1 below shows an example of the final resolution and oversampling factor in the crop area 610.

TABLE 1

| FOV | Horizontal Resolution (target 2704) | Average/Worst Oversampling |
|---|---|---|
| 165° | 3357 | 1.24/0.81 |
| 170° | 3292 | 1.22/0.80 |
| 175° | 3233 | 1.20/0.78 |
| 180° | 3180 | 1.18/0.77 |

As shown in Table 1 above, as you increase the FOV of the crop area, the pixels tend to stretch more. For example, for a 165° FOV crop area for a particular distortion profile, the worst case undersampling position of the image is 0.81 near the corners of the crop area. When the FOV of the crop area is increased to 180°, the worst case undersampling position of the image is 0.77 near the corners of the crop area, therefore indicating that the pixels are stretched more as the FOV of the crop area increases.

FIG. 6B is a diagram showing an example of a crop area 640 at an edge of the image circle 620. In this example, a target resolution for the crop area 640 may be 2.7K, i.e., 2704×2028 pixels. In this example, the crop area 640 is moved to the right to compensate for the movement of the pitch of the image capture device to the left. As shown in this example, the image circle 620 is inscribed within the height of the image sensor 630. The image circle is obtained using an adapter lens, such as adapter lens 420 shown in FIG. 4. Table 2 below shows an example of the final resolution and oversampling factor in the crop area 640.

TABLE 2

| FOV | Horizontal Resolution (target 2704) | Average/Worst Oversampling |
|---|---|---|
| 165° | 3021 | 1.12/0.76 |
| 170° | 2916 | 1.08/0.74 |
| 175° | 2816 | 1.04/0.72 |
| 180° | 2722 | 1.01/0.70 |

As shown in Table 2 above, as you increase the FOV of the crop area, the pixels tend to stretch more. For example, for a 165° FOV crop area for a particular distortion profile, the worst case undersampling position of the image is 0.76. When the FOV of the crop area is increased to 180°, the worst case undersampling position of the image near the corners is 0.70, therefore indicating that the pixels are stretched more as the FOV of the crop area increases.

FIG. 6C is a diagram showing an example of a crop area 650 at another edge of the image circle. In this example, a target resolution for the crop area 650 may be 2.7K, i.e., 2704×2028 pixels. In this example, the crop area 650 is moved to the edge of the image circle to compensate for the movement of the roll of the image capture device. As shown in this example, the image circle 620 is inscribed within the height of the image sensor 630. The image circle is obtained using an adapter lens, such as adapter lens 420 shown in FIG. 4. Table 3 below shows an example of the final resolution and oversampling factor in the crop area 650.

TABLE 3

| FOV | Diagonal Resolution (target 3380) | Average/Worst Oversampling |
|---|---|---|
| 165° | 3705 | 1.10/0.57 |
| 170° | 3574 | 1.06/0.53 |
| 175° | 3450 | 1.02/0.50 |
| 180° | 3330 | 0.99/0.46 |

As shown in Table 3 above, as you increase the FOV of the crop area, the pixels tend to stretch more. For example, for a 165° FOV crop area for a particular distortion profile, the worst case undersampling position of the image near the corners of the crop area is 0.57 indicating that one pixel is stretched to cover an area of almost two pixels. When the FOV of the crop area is increased to 180°, the worst case undersampling position of the image near the corners of the crop area is 0.46, therefore indicating that the one pixel is stretched to cover an area of more than two pixels.

FIG. 7 is a diagram of examples of enhanced electronic image stabilization (EIS) margins 700 of an adapter lens. FIG. 7 shows example crop areas 705A-E during rotation in a yaw dimension 710, pitch dimension 720, pitch+53° roll dimension 730, yaw+37° roll dimension 740, and pitch+yaw dimension 750. Table 4 below shows the improvement of EIS margins for various FOVs when using the adapter lens in conjunction with the image capture device lens for image stabilization when compared to the lens of the image capture device alone.

TABLE 4

| FOV | Yaw | Pitch | Pitch + 53° Roll | Yaw + 37° Roll | Pitch + Yaw |
|---|---|---|---|---|---|
| 165° | ±10° | ±12.9° | ±7.9° | | 4.7° + 6.6° |
| 170° | ±13° | ±17° | | ±10.4° | 6.2° + 8.5° |

TABLE 4-continued

| FOV | Yaw | Pitch | Pitch + 53° Roll | Yaw + 37° Roll | Pitch + Yaw |
|---|---|---|---|---|---|
| 175° | ±15.8° | ±21° | ±12.9° | | 8.1° + 10.4° |
| 180° | ±19° | ±24.8° | ±15.4° | | 8.7° + 10.8° |

Figure 8:
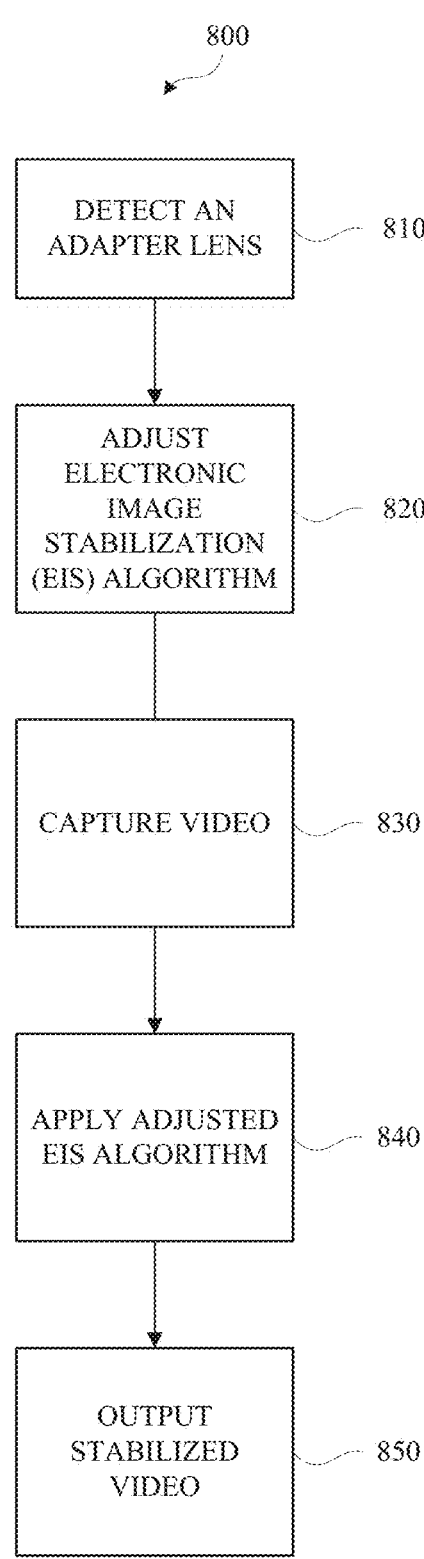
FIG. 8 is a flow diagram of an example of a method for enhanced EIS using an adapter lens.

FIG. 8 is a flow diagram of an example of a method 800 for enhanced EIS using an adapter lens. As shown in FIG. 8, the method 800 includes detecting 810 an adapter lens. Detecting 810 the adapter lens may include receiving an input, for example, a user input, indicating an adapter lens type or an adapter lens mode. In an example, a user may enter an adapter lens mode on the image capture device using a touch interface or a button press. In another example, the adapter lens may be automatically detected by the image capture device when the adapter lens is attached to the image capture device.

The method 800 includes adjusting 820 an EIS algorithm. The EIS algorithm may be adjusted based on a mapping table, such as the mapping table 500 shown in FIG. 5, to compensate for the adapter lens. Since the parameters of the adapter lens and the image capture device lens are known, the EIS algorithm may be adjusted such that the combination of the distortion of the adapter lens and the distortion of the image capture device lens fit the relationship of the parameters of the mapping table. The method 800 includes capturing 830 video as frames and applying 840 the adjusted EIS algorithm to the frames to obtain stabilized frames. Each frame of the video is adjusted based on the mapping table to output 850 the stabilized frames as stabilized video.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture system comprising:
an image capture device comprising:
    an image sensor;
    a lens housing;
    a lens assembly comprising a first group of optical elements disposed within the lens housing; and
    a processor configured to perform electronic image stabilization (EIS); and
an adapter lens configured to enhance EIS of the image capture device, the adapter lens comprising:
    an adapter lens housing configured to interface with the lens housing, wherein the lens housing is configured to automatically detect the adapter lens; and
    a second group of optical elements disposed within the adapter lens housing, wherein the second group of optical elements is configured to project an image as an image circle on the image sensor;
    wherein the processor is further configured to adjust an EIS algorithm based on the detected adapter lens.

2. The image capture system of claim 1, wherein the image sensor has a rectangular surface area.

3. The image capture system of claim 2, wherein the rectangular surface area has a 4:3 aspect ratio or a 16:9 aspect ratio.

4. The image capture system of claim 2, the image circle is confined within the rectangular surface area of the image sensor.

5. The image capture system of claim 1, wherein the processor is configured to obtain a sequence of frames.

6. The image capture system of claim 5, wherein the sequence of frames includes a reference frame and a second frame.

7. The image capture system of claim 1, wherein the processor is configured to adjust the EIS algorithm based on a mapping table.

8. The image capture system of claim 7, wherein the mapping table is based on an optical distortion of the lens assembly and the adapter lens.

9. The image capture system of claim 1, wherein the second group of optical elements includes at least one aspherical element and at least on spherical element.

10. The image capture system of claim 1, wherein the first group of optical elements has a first field of view (FOV).

11. The image capture system of claim 10, wherein the second group of optical elements has a second FOV, and the second FOV is greater than the first FOV.

12. An image capture device comprising:
    an image sensor;
    a lens housing configured to couple to and automatically detect a detachable adapter lens configured to enhance electronic image stabilization (EIS);
    a lens comprising a first group of optical elements disposed within the lens housing; and
    a processor configured to perform EIS, wherein the processor is configured to adjust an EIS algorithm based on the detected detachable adapter lens.

13. The image capture device of claim 12, wherein the detachable adapter lens comprises a second group of optical elements configured to project an image as an image circle on the image sensor.

14. The image capture device of claim 12, wherein the processor is configured to adjust the EIS algorithm based on a mapping table.

15. The image capture device of claim 14, wherein the mapping table is based on an optical distortion of a lens assembly and the detachable adapter lens.

16. The image capture device of claim 12, wherein a second group of optical elements has a greater field of view (FOV) than the first group of optical elements.

17. A method for enhanced electronic image stabilization (EIS) comprising:
    detecting an adapter lens;
    adjusting an EIS algorithm based on the adapter lens;
    applying the adjusted EIS algorithm to video frames to obtain stabilized frames; and
    outputting the stabilized frames as stabilized video.

18. The method of claim 17, wherein a mapping table is used to adjust the EIS algorithm.

19. The method of claim 18, wherein the mapping table is based on an optical distortion of the adapter lens and an optical distortion of an image capture device lens.

20. The method of claim 17, wherein the adapter lens is detected automatically.

* * * * *